Nov. 2, 1937.   H. E. SCHULSE   2,098,210
DISPENSING CONTAINER
Filed Sept. 9, 1933   2 Sheets-Sheet 2
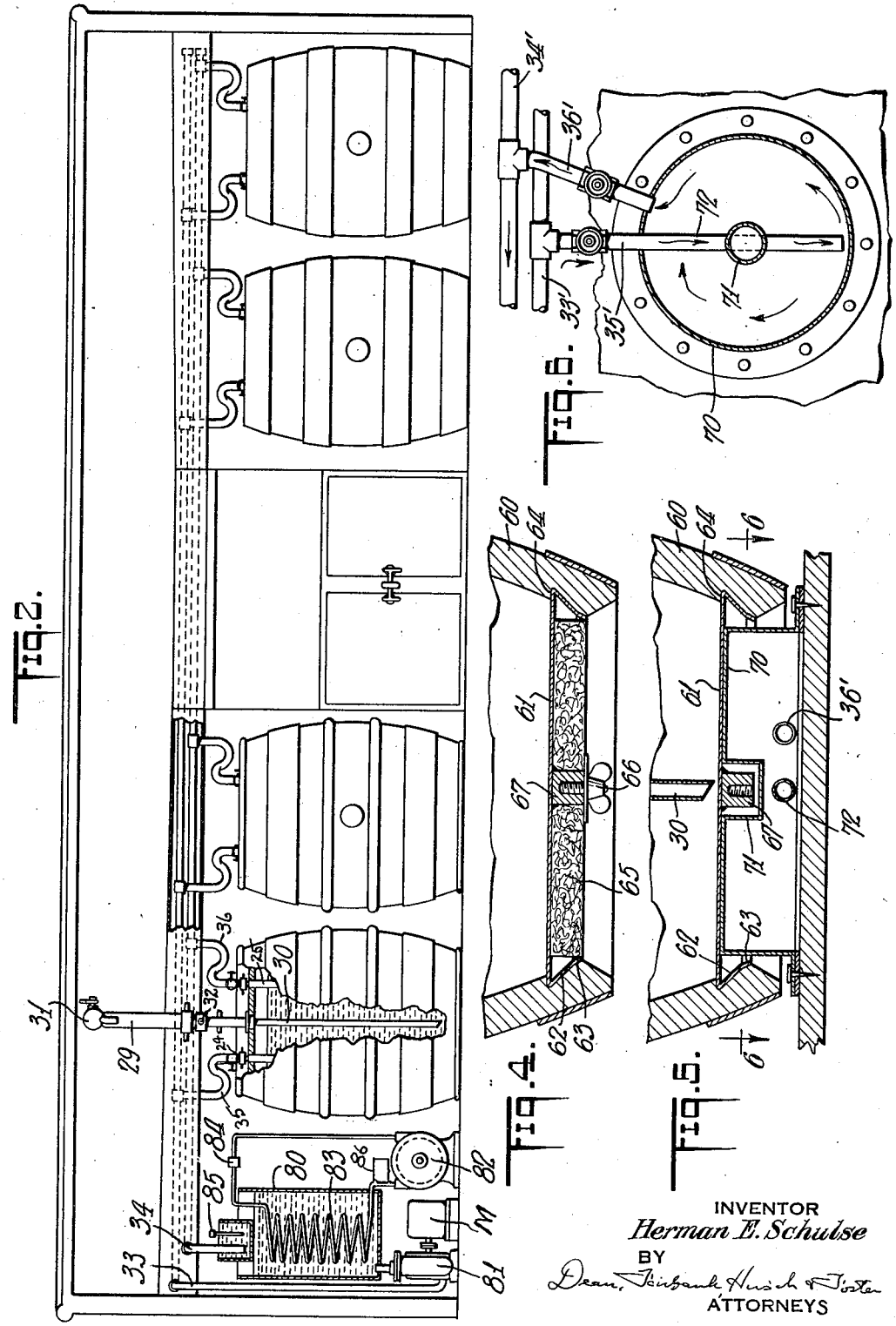
INVENTOR
*Herman E. Schulse*
BY
ATTORNEYS Patented Nov. 2, 1937

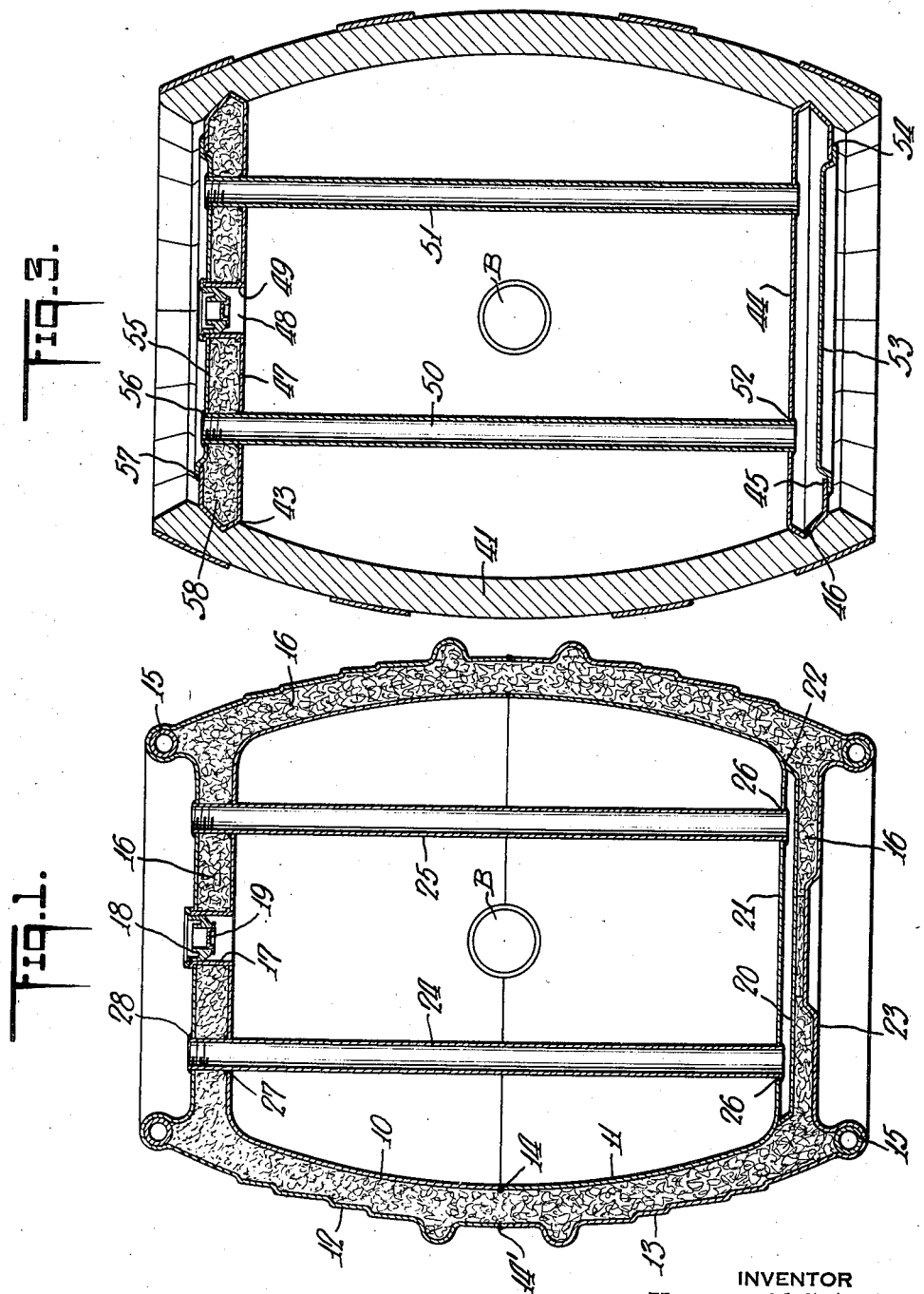

2,098,210

UNITED STATES PATENT OFFICE 2,098,210

DISPENSING CONTAINER

Herman E. Schulse, Jersey City, N. J.

Application September 9, 1933, Serial No. 688,779

15 Claims. (Cl. 257—15)

My present invention is concerned with shipping, cooling and dispensing beverages, to maintain them in most sanitary and palatable condition.

The invention has its preferred applicability in the handling of brew such as beer, although it is by no means limited thereto, and is more especially concerned with the kegs or barrels from which such beverages are drawn for sale in restaurants and at bars.

For a clear understanding of the purpose of the invention, it is noted that with the dispensing barrels heretofore commonly in use when the brew is first drawn from the barrel or keg through a cooling unit, difficulty is encountered due to introduction into the brew of harmful organisms from the scale, mold and slime which form in the course of use in cooling coils, float valves, pressure valves and other control or cooling devices. Not only is the beverage being tapped rendered sour and unpalatable in such installations, but in many cases, the contents of the barrel are spoiled by return thereto of brew from the slime laden cooling unit. Where no such return flow occurs, there is also the waste of spoiled beer that has lodged in the refrigerating unit overnight and must be discarded to avoid rendering the beer unsanitary, and unpalatable.

Frequent removal of such accumulations of scale, mold and slime from the refrigerating unit is an arduous task, commonly neglected, and is, in most cases, unfeasible during the hours that the brew is being dispensed for sale.

Aside from these objections, excessive chilling of beer with the use of refrigerating coils to below the desired temperature generally approved by skilled brewers, results in impaired head, impaired flavor and cloudiness.

In the usual small beer dispensing establishments, cold storage facilities are not available for maintaining several barrels of beer continuously at the preferred temperature, and the difficulty therefore, sometimes results in loss of flavor, due to objectionable fermentation, which may occur when the beer is allowed to reach a temperature much above 50 degrees F.

It is among the objects of the invention, by the simplest of means to maintain the beer within the barrel in proper condition both as to temperature and purity, until it is dispensed directly therefrom, all with the total elimination of separate cooling tanks or receptacles with their coils, float valves and pressure and control valves, and thereby obviating all of the difficulties above noted encountered in the use of such instrumentalities.

Another object is to provide a beverage container which presents a rugged structure devoid of delicate parts useful not only for shipping, but also for cooling and for permitting direct dispensing therefrom.

Another object is to provide a barrel or keg of the above type which can be fabricated in quantity production with the use of parts, standard in beer barrel construction, either of metal or of wooden type; and in which the modifications necessary for the added utility can be readily introduced.

Another object is to provide a barrel or keg construction of the above type, of standard dimensions, and which has the standard volumetric capacity, despite the presence of the cooling instrumentalities incorporated in the construction thereof, and which lends itself readily to handling in the brewery without the slightest alteration in brewers' equipment for barrel handling, washing, filling and the like.

Another object is to provide a shipping and cooling barrel or keg of the above type which may be caused to maintain its contents substantially without variation, at the proper temperature at all times, by the use of the comparatively simple cooling equipment, operable with a minimum of power expense, and devoid of delicate parts apt to become deranged.

The broader claims to the barrel structure, that is, those embracing in their scope the barrel structure disclosed in my prior Patent Number 2,051,013 granted August 11, 1936, are inserted in my co-pending application, Serial Number 91,333, filed July 18, 1936 and to issue concurrently herewith.

The specific subject matter of Figures 4, 5, and 6 is claimed in the divisional application, Serial Number 168,265, filed October 9, 1937.

In the accompanying drawings in which are shown one or more of various possible embodiments of the several features of the invention, Fig. 1 is a view in longitudinal cross-section of one embodiment of the barrel or keg of my invention, Fig. 2 is an elevation of an installation of a number of said barrels, Fig. 3 is a view similar to Fig. 1 of another embodiment, Fig. 4 is a fragmentary sectional view of another embodiment, Fig. 5 is a sectional view showing the barrel of Fig. 4 mounted for cooling, and Fig. 6 is a view in transverse cross-section on line 6—6 of Fig. 5.

Referring now to Fig. 1, there is shown a modern type of steel beer keg, comprising an inner barrel structure of two semi-barrels 10 and 11 welded together at their contacting rims 14 to form the mid-section. The outer wall of the keg is also made of two semi-barrel units 12 and 13, welded together at their contacting mid-sections 14 and reinforced at their tops and bottoms by stay tubing 15. In the space between the inner and the outer barrel wall structures there is a heat insulating filler 16. The barrel has a bung liner or bushing 17 in its upper wall or draft head closed by the bung 18 with the removable tapping cap 19 therein. The barrel also has the conventional hole B at its side for filling and cleaning purposes. The barrel construction which as thus far described, taken by itself, is not my invention, is in quantity production at this time and in extensive use. A modification, not shown, to which the invention is also applicable and which is also on the market, involves the use of solid insulating supports between the inner and outer barrels, dead air rather than solid filler serving as the heat insulating space therebetween.

According to the present invention, this conventional barrel structure is modified, as shown, by providing a flat circular pan 20 of nearly the diameter of the inner barrel head wall 21, said pan being welded at its rim 22 into liquid-tight contact with the outer face of the lower head or wall 21 of the inner barrel, to present an open space between said head and said pan, the insulation 16 intervening between the bottom of the pan and the outer lower head 23 of the keg.

Preferably, metal tubes 24 and 25, which may be and preferably are of Monel metal, are secured at their lower ends in corresponding apertures 26 in the head or wall 21 and these pipes rise vertically the height of the keg and extend through apertures 27 in the upper head or wall of the inner barrel, and through apertures 28 in the upper head or wall of the outer barrel, said tubes being preferably welded to the rims of both apertures 27 and 28. Preferably the upper ends of pipes 24 and 25 are tapped for connection thereto of a circulating cooling system to be described hereinafter.

In the installation shown in Fig. 2, illustratively, behind the dispensing bar or serving counter, kegs, such as described in Fig. 1, are disposed in side by side relation. One of the kegs is shown tapped by a dispensing draft unit 29 shown only diagrammatically and not claimed herein but made the subject of a copending application. This dispensing element comprises preferably a Monel metal tube 30 extending through the tap hole, and also a coupling 32 for applying the air or gas pressure to propel the beer through tube 30 to dispensing faucet 31 carried at the upper end of the dispensing element. Under the bar, there is preferably a feed pipe header 33 for carrying pre-cooled water and a return pipe header 34. The feed pipe 33 is coupled by a flexible hose 35 to the upper end of tube 24 of the keg, and the return pipe 34 is similarly coupled as by an outlet hose 36 to the upper end of tube 25 of the keg. Each keg under the bar is connected at all times to the cooling system, to be tapped when required in the manner shown at the keg at the left of Fig. 2.

Cold water is pumped from an open insulated tank 80 into the feed pipe 33 by a centrifugal pump 81, and the water returns to said tank from the cooling system through pipe 34. A refrigerant compressor 82 supplies refrigerant to refrigerating coil 83 in the tank 80, condenser 86 serving to dissipate the heat of compression, and the operation of the compressor is controlled from a pressurestat (not shown). 84 represents a conventional expansion valve. A thermostat 85 set at the desired temperature and in the return tank 80 controls the circuit of the motor M driving circulating pump 81.

By the present system, a number of kegs may thus be readily accommodated under a short bar, all connected as shown to the circulating cooling system and thereby maintained throughout at correct temperature, neither too high nor too low.

In the continuous circulation, the temperature-regulated water from the header 33 will enter the keg through tube 24, and thence will flow rapidly through the narrow space determined by pan 20 at the bottom, returning by tube 25 to return header 34. Throughout the circulation, both tubes 24 and 25, as well as the space determined by pan 20 will remain at all times filled with water from the circulating system. A substantial area of metal surface, including the entire area of tubes 24 and 25 and of head 21 thus remains in immediate contact with the beer or other beverage and thus serves to impart thereto, substantially the fixed desired temperature of the cooling water. Even if the contents of the keg are initially some degrees higher than the temperature desired, the cooling occurs most rapidly at the bottom where the large area of cooled plate 21 engages the beer, so that properly cooled beer will be dispensed through the draft tube 30 almost at the outset, even though the beer at higher level is still at more elevated temperature.

The operation of the cooling system is so inexpensive compared to ice cooled systems, that it is economical to maintain it in use continuously. The beer remains in the keg throughout, until dispensed and all objections to passing it through complicated chilling instrumentalities are wholly obviated. The beer remains in the barrel or keg at the best temperature to assure its head and aroma and to prevent objectionable fermentation, and all of it remains clear and sanitary throughout and waste is obviated.

The keg with the cooling installation therein is quite as well heat insulating during shipping as is the conventional construction, and as a shipping package has the advantage that tubes 24 and 25 act as reinforcing stays.

In Fig. 3 is shown a modification, applying the principle of Fig. 1 to a conventional wooden barrel or keg construction 41. In the present embodiment, instead of the wooden barrel heads or end walls, metal head structures are accommodated in the conventional crozes 43. The lower metal head is hollow, and comprises a metal tray 44 with an inturned rim 45 presenting an outwardly bulging side wall 46 corresponding to the shape of the croze and lodged therein.

The upper barrel head 47 is of similar construction except that it is centrally perforated at 48 to accommodate the bung bushing or liner 49. The inlet and outlet pipes 50 and 51 are secured at their lower ends, as at 52, into corresponding apertures in tray 44, whereupon the rim 45 of said tray is closed by a cover disk 53 welded at 54 about its rim to effect a liquid-tight hollow head. The upper ends of the pipes 50 and 51 extend through the tray 47 to which they are welded and they also extend through cover disk 55 of the upper head, to which their upper extremities are welded as at 56. The cover disk 55 is, in turn, welded at its rim, as at 57, to the inturned rim of tray 47. Preferably insulating filling 58 completely fills the space within the hollow upper head. It will be understood that the keg just described, can be used interchangeably with that of Fig. 1 in the installation of Fig. 2.

In the embodiment of Figs. 4 and 5 is shown a barrel construction 60, illustratively of wood, having its lower head 61 preferably of metal with downturned flange 62 inturned at 63 and of contour to fit snugly in croze 64. The exposed face of the metal head 61 is covered by a heat insulating disk 65 lodged within the flange 62 and removably fixed to metal head 61, as by a thumb screw 66, threading into a tapped socket 67 welded to the under face of the head 61. The keg thus described, is completely heat insulated, substantially as are those of the other embodiments.

The keg of Figs. 4 and 5 is preferably employed in the system of Fig. 6, in which the circulating cooling feed pipe header 33′, and the return pipe header 34′ are disposed at the floor of the establishment and have taps 35′ and 36′ leading to hollow cooling platforms 70 on the floor over which the lower end of the keg is to be telescoped after manual removal of the thumb screw 66 and of the insulating covering 65. The metal head 61 will then rest flush upon the cooling platform 70 which is countersunk at 71 to accommodate the socket 67 on the barrel head. The lower ends of the barrel staves in that relation are preferably elevated slightly above the floor. Preferably the tap 35′ communicates with a pipe 72 extending diametrically of the cooling platform and emptying thereinto at the side remote from its inlet, while the return tap 36′ is adjacent inlet tap 35′ thus assuring adequate circulation of the cooling water through the platform.

In operation, it will be seen that the cooling platform, contacting with the metal conducting head, will abstract heat as desired from the lower end of the barrel or keg, to cool the latter to the desired temperature at the region from which the beer is withdrawn for consumption.

In all three embodiments shown in Figs. 1, 3 and 4, it will be seen that during shipping, the keg is substantially completely heat insulated. In all three embodiments, metal heat transferring parts are in contact with, and serve to remove heat from the contents of the keg, when subjected to the cooling effect of the heat transfer fluid applied preferably in the lower portion of the keg.

In the embodiment of Figs. 1 and 3, the fluid is directly passed through tubes within the keg to the underface of a hollow metal head plate. In the embodiment of Fig. 4, the cooling fluid remains outside the keg, the lower head of which is brought into direct engagement with a cooled surface.

In all embodiments, the beer or other beverage is cooled while quiescent within the keg, and the major cooling effect is applied essentially through or at the lower end of the keg from which the beverage is withdrawn.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent of the United States is:—

1. A barrel for shipping, cooling and dispensing beverages, having a heat insulating side wall and heat insulating heads, a heat transfer structure substantially at the inner face of one of said heads having a surface in contact with the beverage, and a surface free from contact with the beverage and means including tubing accessible through the opposite head for introducing heat transfer fluid into contact with that surface of said heat transfer structure which is out of engagement with the beverage contents of the barrel.

2. A shipping, cooling and dispensing barrel for beverages having a side wall and heads of heat insulating construction, the lower head having a metal inner face, and having two liquid feed tubes extending longitudinally of the barrel in the interior thereof and accessible through the opposite head of the barrel and connected directly to the lower head, said head having passage means affording communication from one of said feed tubes to the other.

3. A shipping, cooling and dispensing barrel for beverages having a side wall and heads of heat insulating construction, the lower head having a hollow metal walled construction and having two tubes rising from said lower head and in liquid tight communication therewith, said tubes accessible through the opposite head for circulation of heat exchange fluid therethrough, and also serving as stay tubes for the barrel.

4. A barrel for shipping and cooling beverages having a heat insulating wall structure and having heads, one of said heads having an inner metal wall and having a metal pan structure, at that face of said head which is free from contact with the beverage contents of the barrel, and secured at its rim in fluid tight engagement with said face, thus forming a hollow head, means for circulating heat interchange fluid through said hollow head, said means including a feed tube system extending longitudinally of the barrel connected in liquid-tight relation at its lower end to said hollow head and accessible for the entry and withdrawal of heat transfer fluid through the opposite head.

5. In a sheet metal barrel having an inner metal barrel wall and an outer metal barrel wall spaced therefrom; the combination therewith of a flat metal pan secured at its rim in liquid-tight relation to the outer face of the lower head of said inner barrel, a feed and return tube system extending longitudinally of the barrel and communicating at the lower end thereof through the lower head of the inner barrel with the interior of said pan, said feed and return system having an inlet and an outlet accessible from the exterior of the barrel.

6. A beverage shipping and cooling barrel comprising an inner sheet metal wall having heads, an outer sheet metal wall having heads and insulating material filling the space between said walls, said barrel having a flat pan connected at its rim in liquid-tight relation with the lower face of the lower head of said inner wall, a pair of tubes extending longitudinally of said barrel and secured in liquid-tight relation in corresponding holes in said lower inner head for communication with the pan, said tubes extending through the upper heads of both said inner and outer walls.

7. A wooden beverage barrel of conventional construction having crozes at both ends thereof and having a hollow sheet metal head retained in the croze at one end of the barrel, and means accessible from the exterior of said barrel for circulating heat transfer liquid through said hollow head.

8. A wooden barrel for shipping, cooling and dispensing beer having a conventional stave construction and having a hollow metal lower head, said head having tubes upstanding therefrom and communicating with the interior thereof, said tubes accessible through the opposite head, for circulation of heat transfer fluid therethrough.

9. A wooden barrel for shipping, cooling and dispensing beverages, comprising a sheet metal inturned inverted pan structure of substantially the contour of the wooden barrel head which it replaces, tubes secured in liquid-tight relation at their lower ends in said pan and rising therefrom, a cover for the inturned rim of said pan secured thereto in liquid-tight relation therewith, the upper ends of said tubes being exposed at the exterior of the barrel for connection therewith of means for supplying circulating heat transfer fluid.

10. A wooden barrel for shipping, cooling and dispensing beverages, said barrel comprising the usual stave structure, said barrel having a lower hollow metal head of substantially the contour of the wooden head it replaces, and a feed tube structure longitudinally of said barrel, contacting at its lower end with respect to the upper face of the lower head and extending substantially through the upper head, for circulation of heat interchange fluid through said tube structure and said head.

11. A wooden barrel for shipping, cooling and dispensing beverages, said barrel comprising the usual stave structure, said barrel having sheet metal head structures, each of said structures including a tray with an inturned rim presenting substantially the contour of the wooden head it replaces, sheet metal closures at the rims of the respective trays secured thereto in liquid-tight relation, feed tubes secured in liquid-tight communication through the face of the lower tray and extending through and secured to both the face and the closure of the upper tray, thereby to afford means for circulating heat transfer fluid through one of said tubes, thence through the hollow head and thence returning through the other of said tubes.

12. A barrel for shipping, cooling and dispensing beer or the like, having a heat insulating side wall and heat insulating end walls, one of said end walls including a heat conducting plate at the inner face thereof to contact with the contents of the barrel and defining a chamber in said end wall, said barrel having means for circulating cooling fluid through said chamber for maintaining the beer at desired temperature.

13. A heat insulating barrel for shipping, cooling and dispensing beverages, having a heat insulating side wall and heat insulating end walls, a heat transfer metal plate at the inner face of the bottom end wall to contact with the beverage and defining a chamber, and means for circulating cooling fluid through said chamber, said means having an inlet and an outlet at parts of said barrel wall substantially above the lower end wall.

14. A combined transportation cooling and dispensing container for brew comprising a heat insulating structure including a side wall and end walls, a draft outlet and a filling bunghole, a conduit for conveying cooling fluid for lowering the temperature of the container contents, said conduit having an inlet and an outlet exposed through the heat insulating structure, a substantial portion of the volumetric capacity of said conduit being disposed in the space between the inner and the outer faces of said heat insulating structure and affording a metallic surface in heat conductive contact at one face with the cooling fluid and at its opposite face with the brew in the container, all portions of said conduit being clear of the normal paths respectively traversed by a filling or racking tube during insertion through the filling bunghole and of a draft tube during insertion thereof through the draft outlet.

15. The combination recited in claim 14 in which the major portion of cooling surface between the respective faces of the barrel wall is located near the lower end of the container.

HERMAN E. SCHULSE.